United States Patent
Jung et al.

(12) 
(10) Patent No.: US 8,199,129 B2
(45) Date of Patent: Jun. 12, 2012

(54) TOUCH SENSITIVE DISPLAY DEVICE AND METHOD OF DETERMINING TOUCH

(75) Inventors: Ho-Yong Jung, Hwaseong-si (KR); Uk-Chul Choi, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 460 days.

(21) Appl. No.: 12/492,028

(22) Filed: Jun. 25, 2009

(65) Prior Publication Data

US 2010/0149131 A1    Jun. 17, 2010

(30) Foreign Application Priority Data

Dec. 16, 2008    (KR) .................. 10-2008-0128006

(51) Int. Cl.
*G06F 3/042* (2006.01)
*G06F 3/041* (2006.01)

(52) U.S. Cl. ....................................... 345/175; 345/173

(58) Field of Classification Search .......... 345/156–183; 178/18.01–20.04
See application file for complete search history.

(56) References Cited

U.S. PATENT DOCUMENTS

| | | | |
|---|---|---|---|
| 2001/0019628 A1 | 9/2001 | Fujimoto et al. | |
| 2002/0093491 A1* | 7/2002 | Gillespie et al. | 345/173 |
| 2005/0025337 A1 | 2/2005 | Lu et al. | |
| 2005/0060112 A1 | 3/2005 | Schafer et al. | |
| 2006/0119590 A1* | 6/2006 | Park et al. | 345/175 |
| 2006/0269143 A1 | 11/2006 | Kozakaya | |
| 2006/0279557 A1* | 12/2006 | Gettemy | 345/175 |
| 2007/0081726 A1* | 4/2007 | Westerman et al. | 345/173 |
| 2009/0295756 A1* | 12/2009 | Shamaie | 345/175 |
| 2010/0103139 A1* | 4/2010 | Soo et al. | 345/175 |

FOREIGN PATENT DOCUMENTS

KR    2007-0007951    1/2007

* cited by examiner

*Primary Examiner* — Bipin Shalwala
*Assistant Examiner* — Ryan A Lubit
(74) *Attorney, Agent, or Firm* — Innovation Counsel LLP (57) ABSTRACT

In a method for determining a contact of a display device according to an exemplary embodiment, a covariance matrix is used to extract a unique vector and a unique value and to obtain the main component through the unique vector and the unique value. The value of the main component is analyzed to determine the contact existence. The unique vector and the unique value are used to extract the main component, and then the contact existence is determined such that the touch existence and the position thereof may be correctly determined without errors.

14 Claims, 7 Drawing Sheets

$$A = \begin{bmatrix} a_{11} & a_{12} & \cdots & a_{1n} \\ a_{21} & a_{22} & \cdots & a_{2n} \\ \vdots & & & \vdots \\ a_{m1} & a_{m2} & \cdots & a_{mn} \end{bmatrix}$$

FIG. 6

$$A = \begin{bmatrix} a_{11} & a_{12} & \cdots & a_{1n} \\ a_{21} & a_{22} & \cdots & a_{2n} \\ \vdots & & & \vdots \\ a_{m1} & a_{m2} & \cdots & a_{mn} \end{bmatrix} \begin{matrix} \rightarrow X_1 = \frac{1}{n}\sum_{i=1}^{n} a_{1i} \\ \rightarrow X_2 = \frac{1}{n}\sum_{i=1}^{n} a_{2i} \\ \\ \rightarrow X_m = \frac{1}{n}\sum_{i=1}^{n} a_{mi} \end{matrix}$$

FIG. 7

$$A = \begin{bmatrix} a_{11}-X_1 & a_{12}-X_1 & \cdots & a_{1n}-X_1 \\ a_{21}-X_2 & a_{22}-X_2 & \cdots & a_{2n}-X_2 \\ \vdots & & & \vdots \\ a_{m1}-X_m & a_{m2}-X_m & \cdots & a_{mn}-X_m \end{bmatrix}$$

FIG. 8

$$C = \begin{bmatrix} C_{11} & C_{12} & \cdots & C_{1m} \\ C_{21} & C_{22} & \cdots & C_{2m} \\ \vdots & & & \vdots \\ C_{m1} & C_{m2} & \cdots & C_{mm} \end{bmatrix} \quad C_{ij} = \frac{1}{n}\sum_{\ell=1}^{n}(a_{i\ell} - X_i)(a_{j\ell} - X_j)$$

FIG. 9

$$C\mu = \lambda\mu$$
$$(C - \lambda)\mu = 0$$
$$\det|C - \lambda| = 0$$

$$\lambda = \begin{bmatrix} \lambda_1 & 0 & \cdots & 0 \\ 0 & \lambda_2 & \cdots & 0 \\ \vdots & & & \vdots \\ 0 & 0 & \cdots & \lambda_m \end{bmatrix}$$

FIG. 10

TOUCH SENSITIVE DISPLAY DEVICE AND METHOD OF DETERMINING TOUCH

CROSS-REFERENCE TO RELATED APPLICATIONS

This application claims priority to and the benefit of Korean Patent Application No. 10-2008-0128006, filed in the Korean Intellectual Property Office on Dec. 16, 2008, the entire contents of which are incorporated herein by reference.

BACKGROUND

1. Technical Field

The present invention relates to a display device, and particularly, to a contact touch sensitive display device and a method for determining contact.

2. Related Art

Recently, products in which a sensing device is integrated into a display device have been developed. Such a sensing device detects a pressure or a change of light generated by a touch, such as by a user's finger or a touch pen, such that electrical signals according to the touch are provided to the display device. The display device can detect whether or not a touch occurs or touch location information on the basis of the electric signals and transmit the information for the touch to an external device. The external device can transmit the image signal based on the contact information to the display device.

When detecting the touch existence and the position thereof by sensing the intensity of light, a change of brightness due to a shadow of the contact object is detected. However, although the contact object is not contacted, it may be determined that the contact existence is mistaken or the contact position is misjudged due to the shadow at another portion that is not the contact portion.

For example, if the end portion of the finger is taken on the edge of the display panel, a hard shadow is only generated on a narrow region. However, if the finger is only contacted under the state that the palm of the hand and the finger are all taken on the display panel, the hard shadow is generated on the portion covered by the palm of the hand as well as the finger. In this case, the possibility of the generation of an error is increased when determining the touch existence and the position thereof.

The above information disclosed in this Background section should only be for enhancement of understanding of the background of the invention, and therefore, it may contain information that does not form the prior art that is already known in this country to a person of ordinary skill in the art.

SUMMARY

Embodiments of the present invention relate to a contact touch sensing display device and a method for determining contact to more accurately detect touch existence, occurrence, and a position thereof.

A method for determining a contact of a display device according to an exemplary embodiment of the present invention includes receiving a sensing data signal from a light sensor and determining a touch existence and a position thereof by extracting and analyzing a main component from the sensing data signal.

The determining of the touch existence and the position thereof may include selecting at least a portion of the sensing data signal as an analysis matter, extracting a unique vector and a unique value from the selected analysis matter, and extracting and analyzing the main component by using the unique vector and the unique value.

The analysis matter may be selected with reference to a threshold voltage. The analysis matter including the sensing data signal may be selected when a sensing data signal having a lesser value than the threshold voltage is sequential at more than a predetermined number in a row or column direction.

The analysis matter may be the entire row including the analysis matter. The analysis matters may be selected for the sensing data signal to be respectively included when the case that the sensing data signals having a value of less than the threshold voltage are continuous more than the predetermined number which is repeated more than two.

The extracting of the unique vector and unique value may include representing the selected analysis matter as a matrix, calculating and using an average in the row direction in the matrix to obtain a covariance matrix, and obtaining the unique vector and unique value through the covariance matrix.

The matrix arranged to correspond to the arrangement of the light sensor may be represented in the representing of the analysis matter into the matrix.

In the representing of the analysis matter into the matrix, the matters more than two may be combined into one matrix when the selected analysis matter includes the matters more than two that are separated from each other.

The obtaining of the covariance matrix may be executed by the equation below, and here, ail and ajl may respectively be a component of the matrix representing the analysis matter, and Xi and Xj may be an average of i and j rows representing the analysis matter.

$$C_{ij} = \frac{1}{n}\sum_{\ell=1}^{n}(a_{il} - X_i)(a_{jl} - X_j)$$

The obtaining of the unique vector and the unique value may be executed by the equation below, and here, the det may mean a determinant, C may be the covariance matrix and the unique vector, λ may be the unique value matrix having the components of the number m that is not 0, μ may be an arbitrary matrix, and all C, λ, and μ may be the matrix of m×m.

$$\det|C-\lambda|=0$$

The extracting and analyzing the main component by using the unique vector and unique value may include extracting the main component and analyzing the main component, and the extracting of the main component may extract the component of the unique vector corresponding to the highest value and the next highest value among the unique values as the main component.

When the component of the unique vector corresponding to the highest value among the unique values is referred to as a first main component, and when the component of the unique vector corresponding the second highest value among the unique values is referred to as a second main component, the analyzing of the main component may determine that a touch is generated when the first and second main components are included in the predetermined range.

The predetermined range may be determined as a specific range or by selecting a reference region where the contact is not generated and using it with reference to the main component extracted from the reference region. The values of the first and second main components of the region where the touch is generated may be larger than the value of the main component for the reference region.

A display device according to an exemplary embodiment of the present invention includes: a display panel; a plurality of pixels formed in the display panel; a plurality of light sensors formed in the display panel; and a controller extracting a main component of a signal from the light sensor, to determine contact existence of the display panel thereby determining an image that the pixel will display according to the contact existence.

The controller may select an analysis matter in the signal from the light sensor, extract a unique vector and a unique value based on the analysis matter, and extract a main component by using the unique vector and the unique value to determine the contact existence. The unique vector and the unique value may be extracted through a covariance matrix.

The display device may be one of a liquid crystal display, an organic light emitting device, and an electrophoretic display.

An image scan unit and an image data driver connected to the pixels and a sensing scan unit and a sensing signal processor connected to the light sensor may be included.

A signal controller controlling the image scan unit, the image data driver, the sensing scan unit, and the sensing signal processor may be included, wherein the controller may be positioned at one of the signal controller or the sensing signal processor.

Accordingly, the unique vector and the unique value are used to extract the main component, and then the contact existence is determined such that the touch existence and the position thereof may be correctly determined without errors.

DETAILED DESCRIPTION

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a display device according to an exemplary embodiment of the present invention will be described with reference to FIG. 1 to FIG. 3.

Figure 1:
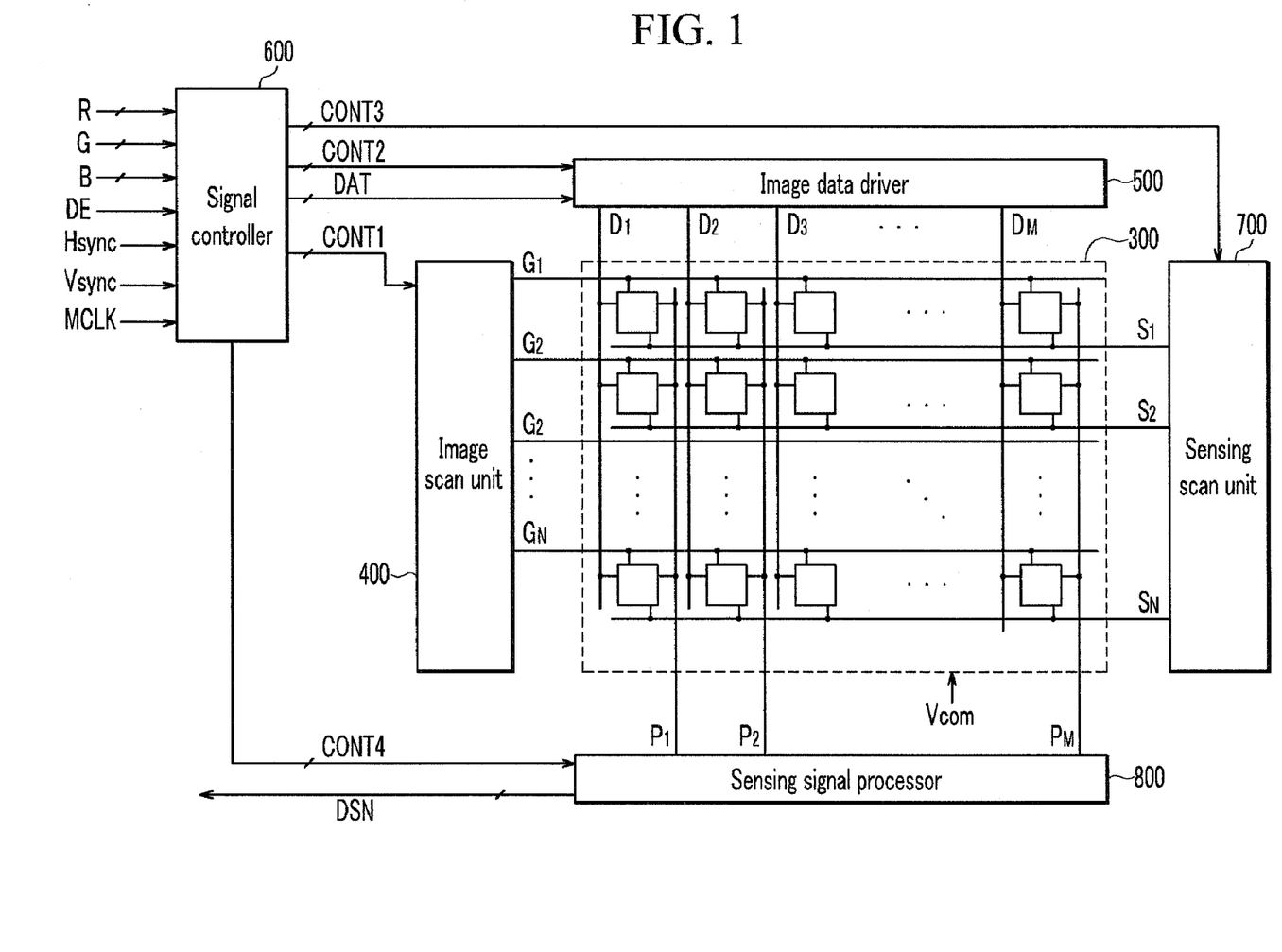
FIG. 1 is a block diagram of a display device, according to an exemplary embodiment of the present invention.

FIG. 1 is a block diagram of a display device, according to an exemplary embodiment of the present invention. FIG. 2 is a equivalent circuit diagram of a light sensor in a display device, according to an exemplary embodiment of the present invention. FIG. 3 is a cross-sectional view of a display device, according to an exemplary embodiment of the present invention.

Referring to FIG. 1, a display device according to an exemplary embodiment of the present invention includes a panel unit 300, an image scan unit 400, an image data driver 500, a sensing scan unit 700, a sensing signal processor 800, and a signal controller 600.

Figure 2:
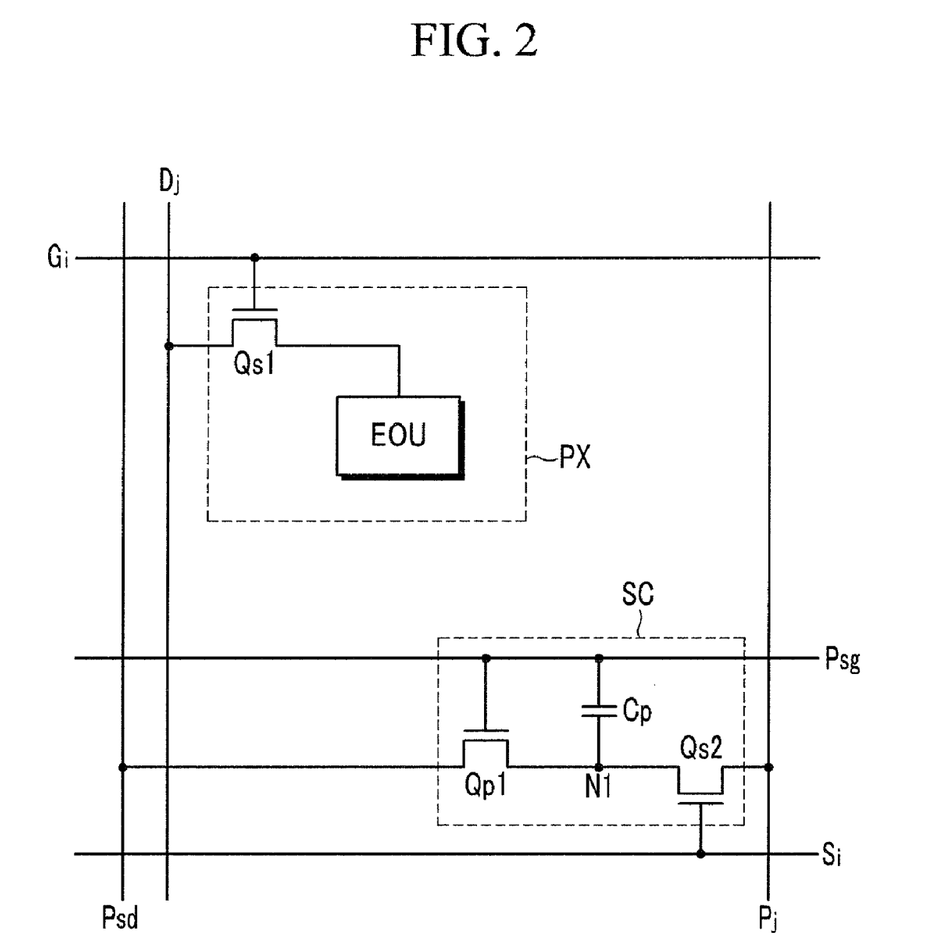
FIG. 2 is an equivalent circuit diagram of a light sensor in a display device, according to an exemplary embodiment of the present invention.

Referring to FIG. 1 and FIG. 2, the panel unit 300 includes a plurality of display signal lines G1-GN and D1-DM, a plurality of pixels PX connected thereto, a plurality of sensing signal lines S1-SN, P1-PM, Psg, and Psd, and a plurality of sensing unit SC connected thereto. The pixels PX and the sensing units SC are arranged in an approximate matrix form.

The display signal lines include a plurality of image scanning lines G1-GN transmitting an image scanning signal and a plurality of image data lines D1-DM transmitting an image data signal.

The sensing signal lines include a plurality of sensing scanning lines S1-SN transmitting a sensing scanning signal, sensing data lines P1-PM transmitting a sensing data signal, a control voltage line Psg transmitting an element control voltage, and an input voltage line Psd transmitting an element input voltage.

The image scanning lines G1-GN and the sensing scanning lines S1-SN extend generally in a row direction to run almost parallel to each other. The image data lines D1-DM and the sensing data lines P1-PM extend generally in a column direction to run almost parallel to each other.

Referring to FIG. 2, each pixel PX, for example, the pixel PX of the i-th row (i=1, 2, N) and the j-th column (j=1, 2, M), includes a switching element Qs1 connected to the image scanning line Gi and the image data line Dj, and an electro-optical converter EOU. In one aspect, when the display device is not an active matrix display device but is a passive matrix display device, the switching element Qs1 may be omitted.

The switching element Qs1 is a thin film transistor having three terminal elements including a control terminal connected to the image scanning line Gi, an input terminal connected to the image data line Dj, and an output terminal connected to electric-optical converter EOU.

The electric-optical converter EOU that converts the electric signal passed through the switching element Qs1 into the optical signal may be changed according to the type of display device and includes a liquid crystal capacitor in the case of the liquid crystal display, an organic light emitting diode in the case of the organic light emitting device, and an electrophoretic capacitor in the case of the electrophoretic display.

Figure 3:
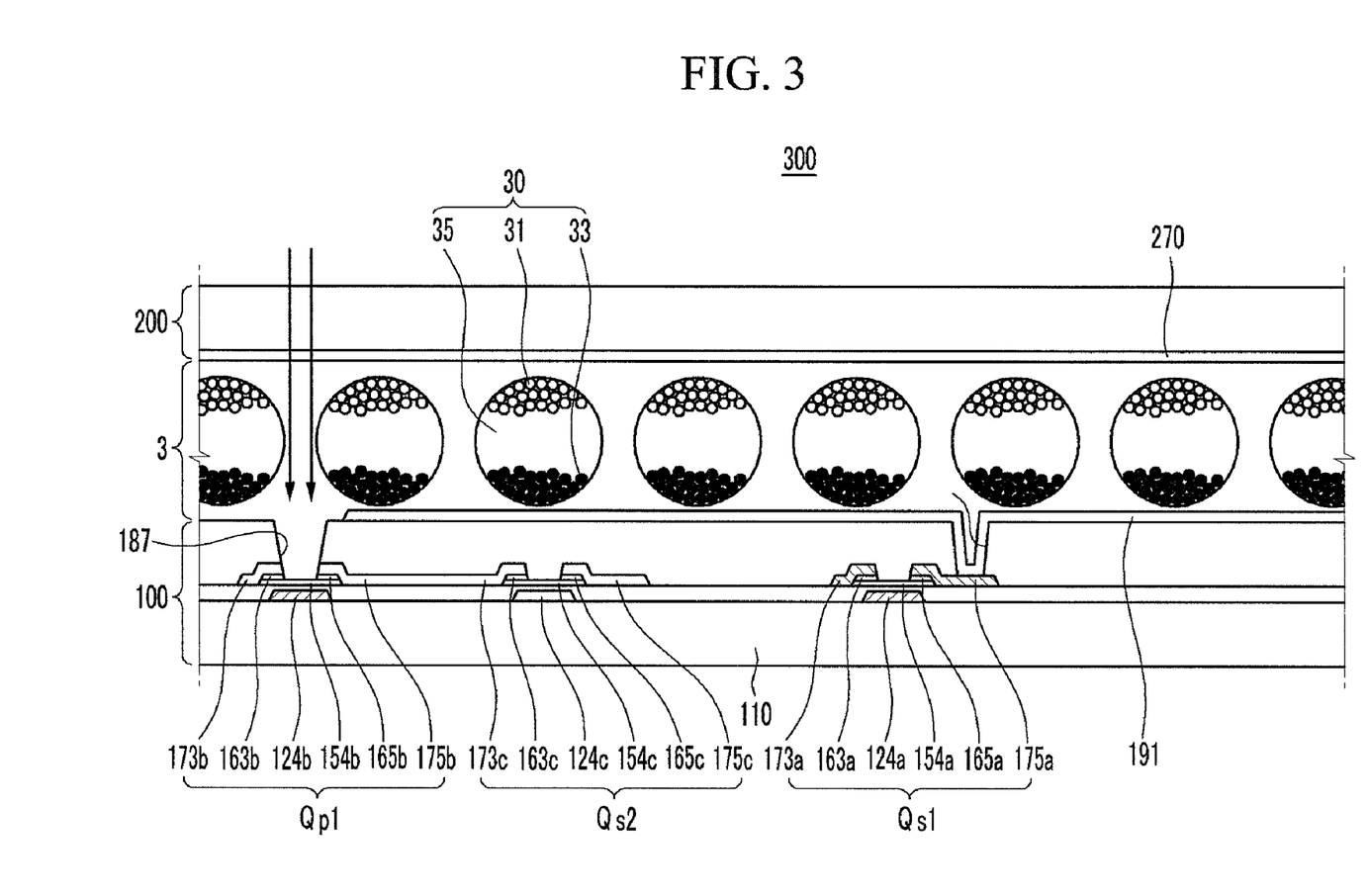
FIG. 3 is a cross-sectional view of a display device, according to an exemplary embodiment of the present invention.

For example, in the case of the electrophoretic display, as shown in FIG. 3, the display panel unit 300 includes a lower panel 100, an upper panel 200, and an electrophoretic layer 3 interposed therebetween. The electrophoretic capacitor includes a pixel electrode 191 of the lower panel 100, a common electrode 270 of the upper panel 200, and an electrophoretic particle capsule 30 interposed therebetween. The capsule 30 includes electrophoretic particles 31 and 33 that are charged with different polarities and a transparent dielectric fluid 35. In FIG. 3, the switching element Qs1 includes a gate electrode 124a, a semiconductor layer 154a, ohmic contact layers 163a and 165a, a source electrode 173a, and a drain electrode 175a. On the other hand, the light sensor SC includes a light sensing element Qp1, a sensing signal capacitor Cp, and a switching element Qs2.

The light sensing element Qp1 as three terminal element includes a control terminal connected to the control voltage line Psg, an input terminal connected to the input voltage line Psd, and an output terminal connected to the switching element Qs2. The light sensing element Qp1 includes a photoelectric material generating a light current if the light is irradiated. An example of the light sensing element Qp1 may be a thin film transistor including a channel semiconductor made of amorphous silicon or polysilicon for generating the light current. The light current is generated and flows in a direction of the sensing signal capacitor Cp and the switching element Qs2 by the input voltage Vsd applied to the input voltage line Psd. It is preferable that the control voltage applied to the control terminal of the light sensing element Qp1 is low enough or high enough for the light sensing element Qp1 to be maintained in an off state. It is preferable that the input voltage applied to the input terminal of the light sensing element Qp1 is low enough or high enough for the light current to flow in a uniform direction. The light current flows in the direction of the switching element Qs2 by the input voltage and also flows in the sensing signal capacitor Cp, thereby being stored in the sensing signal capacitor Cp.

The sensing signal capacitor Cp is connected between the control terminal and the output terminal of the light sensing element Qp1 and accumulates a charge from the light sensing element Qp1 so as to sustain a predetermined voltage. If necessary, the sensing signal capacitor Cp may be omitted.

Also, the switching element Qs2 is a three terminal element, such as a thin film transistor. The switching element Qs2 includes a control terminal, an output terminal, and an input terminal that are respectively connected to the sensing scanning line Si, the sensing data line Pj, and the light sensing element Qp1. The switching element Qs2 outputs the element output signal to the sensing data line Pj according to the sensing scanning signal from the sensing scanning line Si. The element output signal is the light current from the light sensing element Qp1. However, in one aspect, the element output signal may be the voltage stored in the sensing signal capacitor Cp.

The sensing unit SC may be disposed in the same region as the pixel PX or may be separated from the pixel PX. In the latter case, the sensing unit SC may be disposed between the pixels PX or in the separated region.

The density of the sensing unit SC may be the same as the density of the pixel PX, and if not, the number N of the sensing scanning lines S1-SN and the number M of the sensing data lines P1-PM may be respectively different from the number N of the image scanning lines G1-GN and the number M of the image data lines D1-DM.

The switching elements Qs1 and Qs2 and the light sensing element Qp1 may be made of an amorphous silicon or polysilicon thin film transistor.

Referring to FIG. 1, the image scan unit 400 is connected to the image scanning lines G1-GN of the display panel unit 300 and applies the image scanning signal made of the combination of the gate-on voltage and the gate-off voltage to the image scanning lines G1-GN.

The image data driver 500 is connected to the image data lines D1-DM of the display panel unit 300 and selects the gray voltage from the gray voltage generator 550 to apply it as the image data signal to the pixel.

The sensing scan unit 700 is connected to the sensing scanning lines S1-SN of the display panel unit 300 and applies the image scanning signal made of the combination of the gate-on voltage and the gate-off voltage to the sensing scanning lines S1-SN.

The sensing signal processor 800 is connected to the sensing data lines P1-PM of the display panel unit 300, receives the sensing data signal from the sensing data lines P1-PM to execute a signal process such as amplifying and filtering, and analog-digital converts it to thereby generate the digital sensing data signal DSN. The sensing data signal transmitted through the sensing data lines P1-PM may be a current signal. In this case, the sensing signal processor 800 converts the current signal before the analog-digital conversion into the voltage signal. One sensing data signal transmitted through one sensing data line P1-PM may be one element output signal output from one switching element Qs2 or more than two element output signals output from more than two switching elements Qs2.

The signal controller 600 controls the operations of the image scan unit 400, the image data driver 500, the sensing scan unit 700, and the sensing signal processor 800.

Next, the operation of the display device will be described.

The signal controller 600 receives input image signals R, G, and B and an input control signal to control the display of the image signals R, G, and B from a graphics controller (not shown). The input image signals R, G, and B contain luminance information of each pixel (PX). The luminance has a predetermined number of grays, such as 1024 ($=2^{10}$), 256 ($=2^8$), or 64 ($=2^6$). Examples of the input control signals may include a vertical synchronization signal Vsync, a horizontal synchronizing signal Hsync, a main clock signal MCLK, a data enable signal DE, and the like.

The signal controller 600 processes the input image signals R, G, and B in such a way to be suitable for the operating conditions of the display panel unit 300 based on the input image signals R, G, and B. The signal controller 600 generates an image scan control signal CONT1, an image control signal CONT2, a sensing scan control signal CONT3, and a sensing data control signal CONT4. The signal controller 600 sends the image scan control signal CONT1 to the image scan unit 400 and the image data control signal CONT2 and a processed image signal DAT to the image data driver 500. Also, the signal controller 600 sends the sensing scan control signal CONT3 to the sensing scan unit 700, and the sensing data control signal CONT4 to the sensing signal processor 800.

The image scan control signal CONT1 includes an image scanning start signal STV to instruct of the start of image scanning and at least one clock signal to control an output cycle of the gate-on voltage. The image scan control signal CONT1 may include an output enable signal OE to define a sustaining time of the gate-on voltage.

The image data control signal CONT2 includes a horizontal synchronization start signal STH informing of the transmission start of image data for a group of pixels PX, a load signal LOAD to instruct the data voltage 1 to be applied to the image data lines D1-DM, and a data clock signal HCLK.

The sensing scan control signal CONT3 includes a sensing scanning start signal STVS to instruct of the start of the sensing scan and at least one clock signal to control the output cycle of the sensing scanning signal Vs1-VsN.

The operation of the display device may be largely divided into an operation displaying the images on the screen through the pixels PX and an operation detecting the contact existence through the sensing units SC. Two operations may be simultaneously executed or may be independently executed. In the case of the latter, the display device may only execute the display operation during the display period, and may only execute the sensing operation during the sensing period.

Firstly, the display operation will be described in detail.

The image data driver 500 receives digital image signals DAT for a row of pixels PX according to the data control signal CONT2 transmitted from the signal controller 600 and selects a gray scale voltage corresponding to each digital image signal DAT to convert the digital image signals DAT into analog data signals. Thereafter, the data driver 500 applies the converted analog data signals to corresponding data lines D1 to Dm.

The image scan unit 400 applies a gate-on voltage to the image scanning lines G1-GN according to the image scan control signal CONT1 transmitted from the signal controller 600 to turn on switching devices Qs1 connected to the image scanning lines G1-GN. Then, the data voltages applied to the image data lines D1-DM are applied to corresponding electro-optical converters EOU through the turned-on switching element Qs1.

The electric-optical converter EOU converts the data voltage into the optical signal, thereby displaying the desired images.

In the case of the electrophoretic display, the positions of the electrophoretic particles 31 and 33 in the particle capsule 30 are variously changed according to the magnitude of the data voltage, the polarity thereof, and the application time. That is, the data voltage applied to the pixel electrode 191 through the switching element Qs1 connected to the data line shown in FIG. 3 forms the electric field along with the common electrode 270, and the magnitude of the electric field is different according to the magnitude of the data voltage. The movement direction and the movement distance of the electrophoretic particles 31 and 33 are changed according to the multitude of the electric field thereby displaying images of the different gray.

When the electrophoretic particles 31 and 33 include white color electrophoretic particles 31 and black color electrophoretic particles 33, the electrophoretic particles 31 and 33 are charged with the charge of the different polarity such that they move in opposite directions, and the positions thereof are changed according to the magnitude of the electric field. When only the black color electrophoretic particles 33 are close to the common electrode 270, the black is displayed, and when only the white color electrophoretic particles 31 are close to the common electrode 270, the white is displayed. In another case, the gray displays are possible according to the number of white electrophoretic particles 31 and black color electrophoretic particles 33 close to the common electrode 270. If the electrophoretic particles 31 and 33 include colored particles, color display is possible through the above-described method.

In units of one horizontal period, which may be written as "1H" and is the same as one period of the horizontal synchronization signal Hsync and the data enable signal DE, the aforementioned operations are repeatedly performed to sequentially apply the gate-on voltages to all the image scanning lines G1 to Gn, so that the data signals are applied to all the pixels PX. As a result, one frame of the image is displayed.

Next, the sensing operation of the display device will be described.

The sensing scan unit 700 applies the high voltage to the sensing scanning lines S1-SN according to the sensing scan control signal CONT3 from the signal controller 600 to turn on the switching element Qs2 connected to the sensing scanning lines S1-SN. Thus, the switching element Qs2 outputs the element output signal to the sensing data lines P1-PM to generate the analog sensing data signal, and the analog sensing data signal is input to the sensing signal processor 800.

The sensing signal processor 800 signal-processes the analog sensing data signal, such as amplifying and filtering, converts it into the digital sensing data signal DSN, and outputs it.

The signal controller 600 or the external device extracts the main components through a unique vector and a unique value by using the digital sensing data signal DSN and detects the touch existence and the position thereof through them. That is, the contact pattern is analyzed through the analysis method of the main components, and the contact existence is determined through them.

The main component analysis uses multiple multivariate data as the analysis matter, and the object thereof is simplification in reducing and summarizing the multi-dimensional variables and the analysis of the complex structure between reaction variables that are correlated. For this purpose, the main component analysis linear-converts the multi-dimensional reaction variables to output artificial variables of two or three dimensions that is referred to as a main component, and they are irrelevant to each other or independent. Here, the sequence of the importance may be considered with reference to the size of the variation included in each main component. Among the main components, a small number of the main components are converted to include many portions among the entire variation included in the original data, thereby minimizing the loss of the information according to the simplification.

The main component analysis method according to an exemplary embodiment of the present invention will be described with reference to FIG. 4 to FIG. 10.

Figure 4:
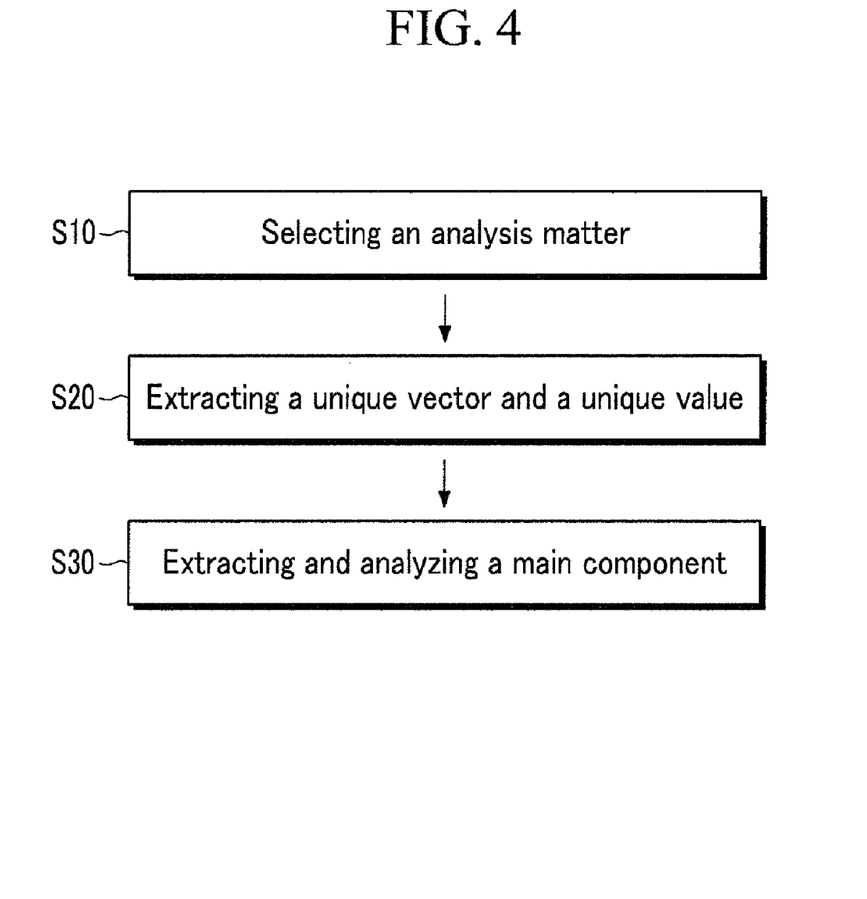
FIG. 4 is a flow chart showing a method for analyzing a main component, according to an exemplary embodiment of the present invention.

FIG. 4 is a flow chart showing a method for analyzing a main component, according to an exemplary embodiment of the present invention. FIG. 5 to FIG. 9 are views for explaining a step for extracting a unique vector and a unique value in a method for analyzing a main component, according to an exemplary embodiment of the present invention. FIG. 10 is a view for explaining a method for analyzing an extracted main component in a method for analyzing a main component, according to an exemplary embodiment of the present invention.

Firstly, referring to FIG. 4, a method for analyzing a main component according to an exemplary embodiment of the present invention is shown as a flow chart. The method for analyzing the main component according to an exemplary embodiment of the present invention includes selecting an analysis matter S10, extracting a unique vector and a unique value based on the selected analysis matter S20, and extracting and analyzing a main component based on the extracted unique vector and unique value S30, as shown in FIG. 4.

In the selecting of the analysis matter S10, all the digital sensing data signals DSN are selected or a portion thereof is selected. When the portion is selected, various references may be selected, and a method for selecting a threshold voltage as the reference will be described in the exemplary embodiment of the present invention.

Firstly, the threshold voltage is determined (in the present exemplary embodiment, the threshold voltage is determined and converted into a digital value), and the portion of the digital sensing data signals DSN having a lesser value than the threshold voltage and continuous at more than the predetermined number in the row or column direction is searched. The portion of the region that is determined around the portion searched by this method may only be selected, or the row total including the searched portion may be selected. Also, when the portion where the digital sensing data signals DSN are continuous at more than the predetermined number exists in several portions, the selected portion may be in several portions. Although the digital sensing data signals DSN has a value that is more than the threshold voltage, a portion thereof may be selected to use as the reference region of the main component analysis. As above-described, when a plurality of regions are selected, the number of columns of the selected region may be the same.

The determined range may be changed with reference to the size of the display device or the touched matter. That is, it is preferable that it is determined to have a larger region in the case that the finger of the user is touched than the case that a touch pen is used.

On the other hand, in the present exemplary embodiment, the range is selected with reference to the sensing data signal having the lesser voltage than the threshold voltage. However, it may be selected with reference to the sensing data signal having the greater voltage than the threshold voltage according to an exemplary embodiment. Also, in the present exemplary embodiment, the analysis matter is selected with reference to the digital sensing data signals DSN. However, the above-described selection steps may be executed based on the analog sensing data signal input from the sensing unit SC.

As above-described, the selected analysis matter through the step S10 of selecting the analysis matter extracts the unique vector and unique value through the step S20 of extracting the unique vector and unique value, according to an exemplary embodiment of the present invention.

The step S20 of extracting the unique vector and unique value according to an exemplary embodiment of the present invention is described in detail in FIG. 5 to FIG. 9. The step S20 of extracting the unique vector and unique value includes representing the selected analysis matter in a matrix shown in FIG. 5, calculating the average per each row and a covariance matrix by using the average as shown in FIG. 5 to FIG. 8, and calculating the unique vector and unique value by using the covariance matrix as shown FIG. 9.

Firstly, the step of representing the selected analysis matter into the matrix shown in FIG. 5 will be described.

Figure 5:
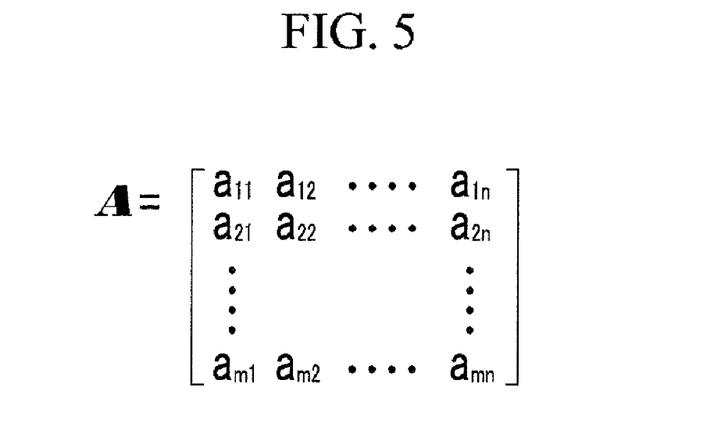
FIG. 5 to FIG. 9 are views for explaining a step for extracting a unique vector and a unique value in a method for analyzing a main component, according to an exemplary embodiment of the present invention.

The data of the selected analysis matter through the step S10 is represented into the matrix of FIG. 5. An A matrix shown in FIG. 5 is a matrix in which the digital sensing data signals DSN are arranged corresponding to the arrangement of the sensing units SC. The A matrix is shown with n rows and m columns. When the entire digital sensing data signals DSN are selected as the analysis matter, the A matrix may correspond to the total number of sensing units SC of the panel. When a portion thereof is selected, the A matrix may correspond to the portion region of the sensing units SC. That is, m may be the total number of sensing units SC of the column number N in FIG. 1 or a portion thereof, and n may be the total number of the sensing units SC of the row number N in FIG. 1 or the portion thereof. As such, in one aspect, the components a11-amn included in the A matrix represent the selected digital sensing data signals DSN.

When the selected analysis matter is presented in the plurality of regions, it is preferable that the matrix is selected to have the number of the row such that matrices representing each region are combined in the row direction to make one matrix. That is, when making one matrix, the following step may be executed at the same time. However, it is possible to execute the following steps per each region. Also, it is not necessary to accord the number of the column of the selected region. That is, when the number columns is different, one matrix may be formed in the row direction, and the column having 0 or the predetermined value in the matrix having the small row number is extended and combined in this case.

Figure 6:
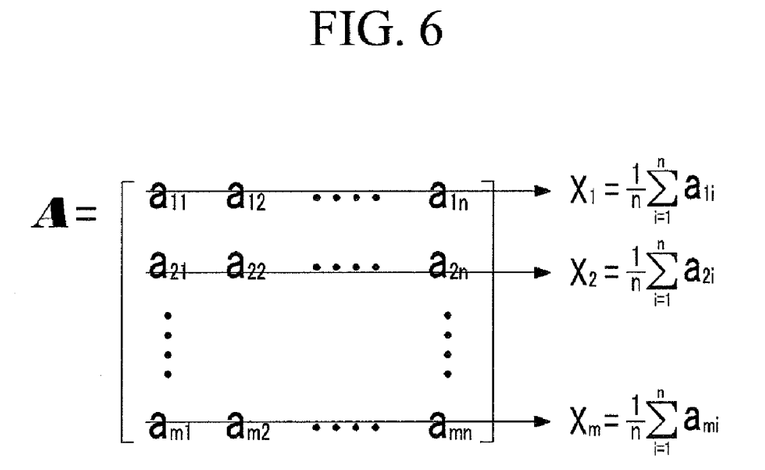
Figure 7:
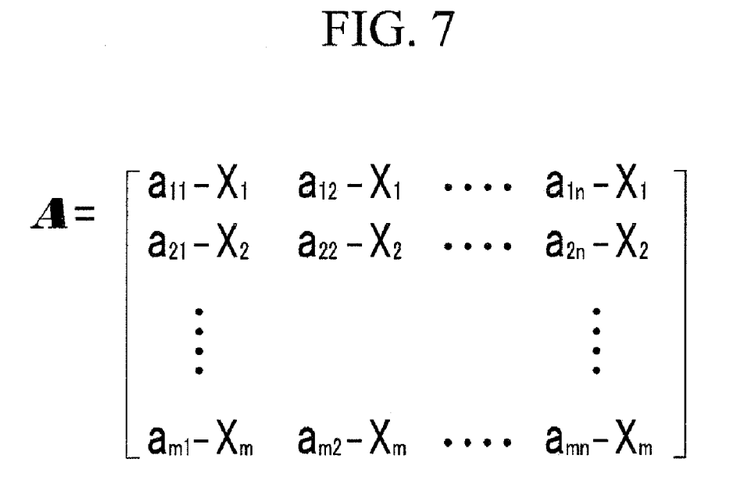
Figure 8:
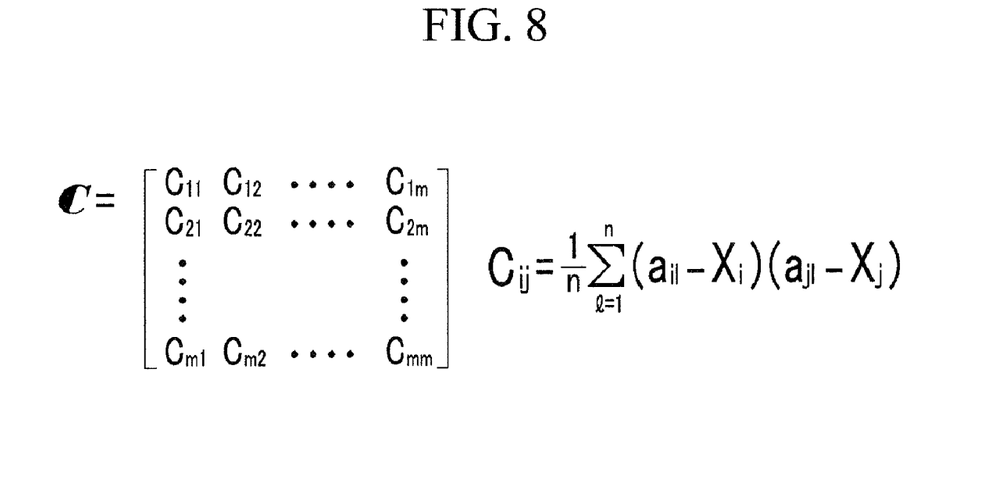

The analysis matter represented by the matrix is converted into a covariance matrix, as shown in FIG. 6 to FIG. 8.

The step of calculating the covariance matrix includes calculating the average per each column, as shown in FIG. 6, subtracting the average per each column calculated, as shown in FIG. 7 from the value of each column, and converting into the covariance matrix of m–m, as shown in FIG. 8.

Firstly, as shown in FIG. 6, the average Xm per each column is calculated in the A matrix. Next, as shown in FIG. 7, the calculated average Xm is subtracted from the corresponding column. After executing the step of FIG. 7, the component having the greater value than the average has a positive value, and the component having the lesser value than the average has a negative value in each column of the A matrix.

Next, as shown in FIG. 8, the A matrix is converted to generate the covariance matrix C. The covariance matrix C is obtained from Equation 1 below.

$$C_{ij} = \frac{1}{n}\sum_{l=1}^{n}(a_{il} - X_i)(a_{jl} - X_j)$$ (Equation 1)

Here, ail and ajl are respectively the components of the A matrix, and Xi and Xj are respectively the average of I and j columns.

The covariance matrix C generated in FIG. 8 is a matrix having the number M of all rows and columns, differently from the A matrix. Here, m accords the number of the column of the A matrix.

Figure 9:
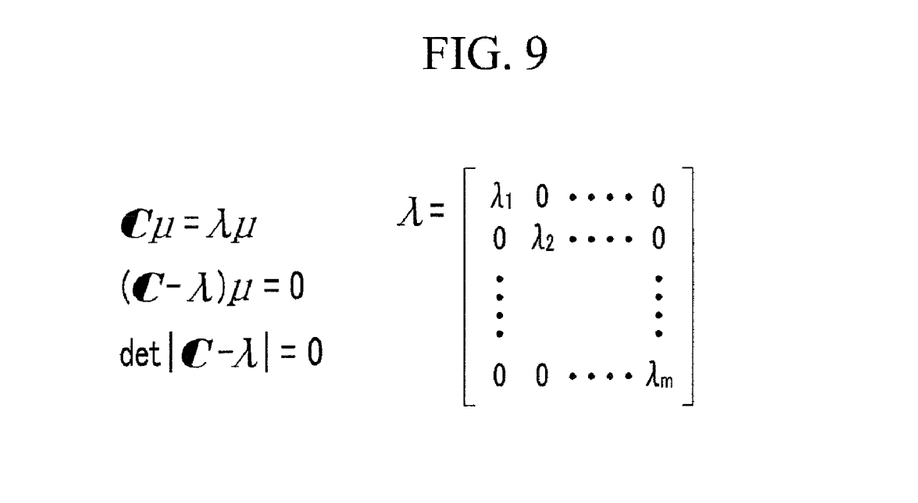
Figure 10:
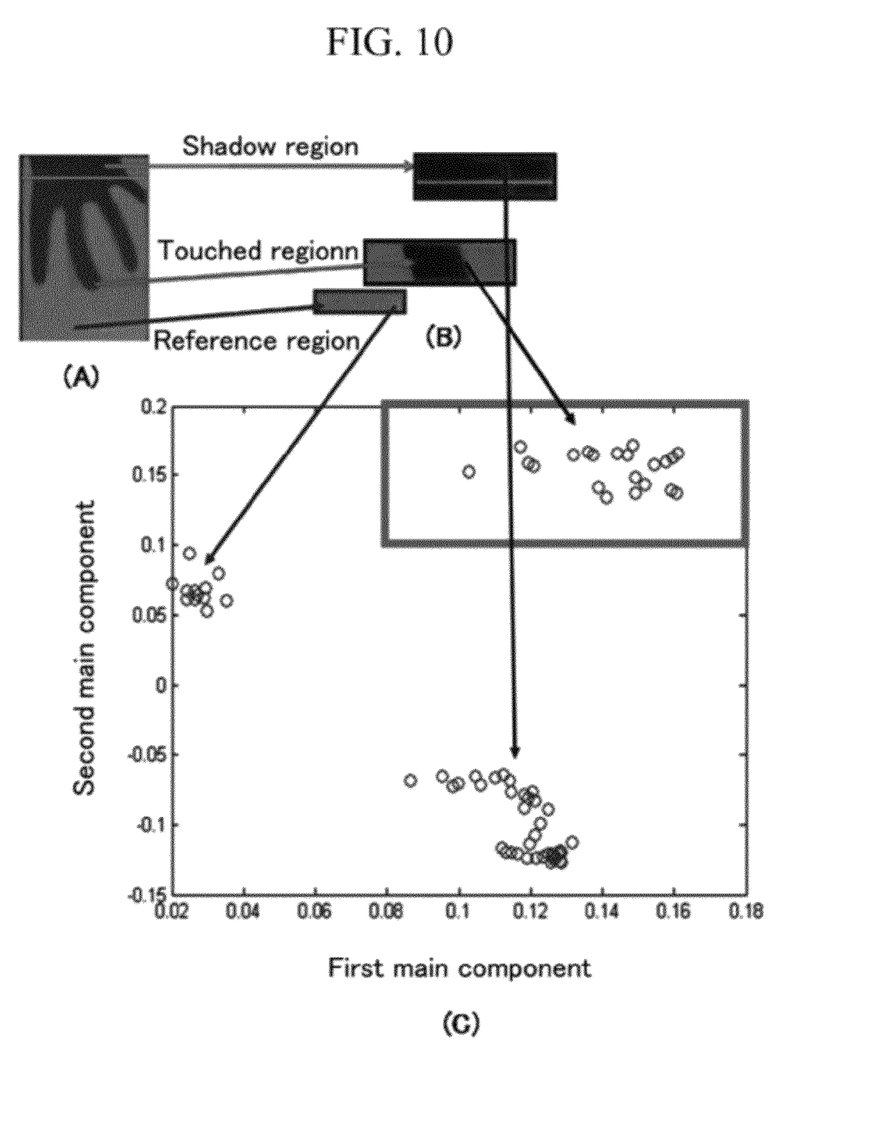
FIG. 10 is a view for explaining a method for analyzing an extracted main component in a method for analyzing a main component, according to an exemplary embodiment of the present invention.

Next, as shown in FIG. 9, a matrix λ of the unique value is obtained by using the obtained covariance matrix C. The unique value matrix λ is obtained through Equation 2 below. In FIG. 9, C, λ, and μ all are the matrix of m×m.

$$\det|C - \lambda| = 0$$ (Equation 2)

Here, det means a determinant.

In FIG. 9, the process in which Equation 2 is generated will be described. That is, Equation 2 is generated from the equation which makes a multiple value of the arbitrary vector μ and the covariance matrix C to be equal to a multiple value of the arbitrary vector μ and the unique value matrix λ.

Here, the covariance matrix C is referred to as a unique vector corresponding to the unique value matrix λ. The unique value matrix λ has the components of the number m that is not 0, that is, the unique values λ1-λm, as shown in FIG. 9.

As above-described, in the exemplary embodiment of the present invention, the unique values λ1-λm and the unique vector C are extracted. When extracting the unique values λ1-λm and the unique vector C, the matrix calculation is described. However, when actively processing the data, the matrix is not actively generated, but they may be processed through a calculation conforming to the matrix calculation.

Next, as shown in FIG. 10, the step S30 for extracting and analyzing the main components based on the unique values λ1-λm and the unique vector C is executed.

Firstly, the main components are extracted through the following method.

Among the components of the number m of the extracted unique values λ1-λm, the highest value λp and the following value λq are selected, and the components of the unique vectors C corresponding to the selected unique values λp and λq are selected. In the present exemplary embodiment, corresponding to the unique values λ1-λm means the components of the selected unique values λp and λq, and the multiplied unique vector C when calculating the multiplication of the matrix in the state in which the unique vector C is disposed before the unique value matrix λ. Therefore, the components of the unique vector C corresponding to one unique value is one column, and as a result total, two columns are selected.

The above-selected two columns are referred to as the main components. Also, the column corresponding to the highest unique value λp among the main components is referred to as the first main component, and the column corresponding to the next highest unique value λq is referred to as the second main component.

The main components have the matrix of m×2 including the first column of the first main component and the second column of the second main component and are represented in a graph including a horizontal axis of the first main component and a vertical axis of the second main component. Here, the indicated total points is m, and is shown in FIG. 10(C).

The display device has the value of the predetermined range for the first main component and the second main component, and the touch is detected when the first main component and the second main component are included in the predetermined range. Also, if the sensing unit SC corresponding to the data that the touch is generated is detected, the touch position may be determined. In FIG. 10(C), the example that the main component is represented in the graph is shown, and the region defining a rectangular box represents the predetermined range that is determined as the first and second main components.

Therefore, the sensing unit SC corresponding to the point included in the rectangular box is executed to be touched. The predetermined range for the first and second main components may be a range itself determined by the display device or may be a region relatively determined by determining a reference region that the touch is not generated when considering the circumference environment, calculating the value of the main component for the reference region, and comparing the values. Here, the case in which the touch is generated may be the case in which the values of the first and second main components are larger than the value of the main component for the reference region.

On the other hand, FIG. 10 explains the method of analyzing the extracted main components and shows the entire main component analysis method.

Firstly, in FIG. 10(A), the data sensed through the sensing units SC is shown. Also, in FIG. 10(B), it is shown that the portion of the sensed data, and a shadow region, a touched region, and a reference region are selected in the exemplary embodiment of FIG. 10. Here, it is shown that the size of each region (particularly, the number of columns) is different.

The selected regions (the shadow region, the touched region, and the reference region) are respectively made of one matrix, the unique vector and unique value are extracted based on the selected analysis matter, and the main component is extracted based on the unique vector and unique value. FIG. 10(C) shows displaying of the main components on the graph and analyzing them.

As shown through the relationship of FIGS. 10(B) and (C), according to an exemplary embodiment of the present invention, the reference region, the touched region, and the shadow region are disposed on different regions on the graph such that the first main component and the second main component are defined in the predetermined range to classify the shadow region and to determine the touched region.

As above-described, in an exemplary embodiment of the present invention, the main component analysis is processed based on the digital sensing data signal DSN and may be processed in the signal controller 600 or an external device.

On the other hand, according to the exemplary embodiment, the sensing data input from the sensing unit SC is used such that it may be processed in the sensing signal processor 800.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for determining a contact of a display device, comprising:
    receiving a sensing data signal from each light sensor of a matrix of light sensors arranged in rows and columns; and
    determining a touch existence and a position thereof by extracting and analyzing a component of the sensing data signal;
    wherein the determining of the touch existence and the position thereof further includes:
        selecting at least a portion of each sensing data signal as an analysis matter:
        assembling a first matrix of sensed data signals, the matrix of sensed data signals having row elements corresponding to the selected portions of the sensing data signals from respective rows of the light sensors, and column elements corresponding to the selected portions of the sensing data signals from respective columns of the light sensors;
        determining a second matrix of sensed data signals by, for each row of the first matrix of sensed data signals, determining an average value of the row elements of that row, and subtracting the average value from each row element of that row;
        determining a covariance matrix from the second matrix;
        determining eigenvalues of the covariance matrix;
        selecting highest values of the eigenvalues, and selecting columns of the covariance matrix corresponding to the selected highest values of the eigenvalues;
        determining the touch existence according to whether values of elements of the selected columns fall within one or more predetermined ranges.

2. The method of claim 1, wherein the analysis matter is selected with reference to a threshold voltage.

3. The method of claim 2, wherein the analysis matter is selected according to whether the corresponding sensing data signals of a predetermined number of consecutive row or column elements each fall below the threshold voltage.

4. The method of claim 3, wherein the analysis matter is the entire row including the analysis matter.

5. The method of claim 3, wherein more than one analysis matter is selected.

6. The method of claim 1, wherein the covariance matrix is determined by the equation below:

$$C_{ij} = \frac{1}{n}\sum_{l=1}^{n}(a_{il} - X_i)(a_{jl} - X_j)$$

wherein ail and ajl are respectively a component of the first matrix, and
wherein Xi and Xj are the determined average values of i and j rows.

7. The method of claim 1, wherein the determining eigenvalues is executed by the equation below:

$$\det|C-\lambda|=0$$

wherein the det means a determinant, C is the covariance matrix and the λ is a matrix of the eigenvalues.

8. The method of claim 1, wherein the selecting highest values further comprises selecting the two highest values of the eigenvalues.

9. The method of claim 8, wherein the touch existence is determined when the values of the elements of the selected columns corresponding to the two highest values of the eigenvalues each fall within the one or more predetermined ranges.

10. The method of claim 9, wherein the predetermined range is determined as a specific range or ones of the selected columns corresponding to portions of the display device not receiving the contact.

11. A display device comprising:
a display panel;
a plurality of pixels formed in the display panel;
a plurality of light sensors formed in the display panel; and
a controller programmed to determine the existence of a touch upon the display panel, by performing the following:
selecting at least a portion of each sensing data signal as an analysis matter;
assembling a first matrix of sensed data signals, the matrix of sensed data signals having row elements corresponding to the selected portions of the sensing data signals from respective rows of the light sensors, and column elements corresponding to the selected portions of the sensing data signals from respective columns of the light sensors;
determining a second matrix of sensed data signals by, for each row of the first matrix of sensed data signals, determining an average value of the row elements of that row, and subtracting the average value from each row element of that row;
determining a covariance matrix from the second matrix;
determining eigenvalues of the covariance matrix;
selecting highest values of the eigenvalues, and selecting columns of the covariance matrix corresponding to the selected highest values of the eigenvalues;
determining the touch existence according to whether values of elements of the selected columns fall within one or more predetermined ranges.

12. The display device of claim 11, wherein the display device is one of a liquid crystal display, an organic light emitting device, and an electrophoretic display.

13. The display device of claim 11, further comprising:
an image scan unit and an image data driver connected to the pixels; and
a sensing scan unit and a sensing signal processor connected to the plurality of light sensors.

14. The display device of claim 13, further comprising a signal controller controlling the image scan unit, the image data driver, the sensing scan unit, and the sensing signal processor.

* * * * *